July 11, 1939. E. VON LEPEL Re. 21,150

SOURCE OF LIGHT AND METHOD OF OPERATING THE SAME

Original Filed July 1, 1932

INVENTOR
Egbert von Lepel
BY
ATTORNEYS

Reissued July 11, 1939

Re. 21,150

UNITED STATES PATENT OFFICE 21,150

SOURCE OF LIGHT AND METHOD OF OPERATING THE SAME

Egbert von Lepel, New York, N. Y.

Original No. 1,919,490, dated July 25, 1933, Serial No. 620,403, July 1, 1932. Application for reissue October 24, 1938, Serial No. 236,831

3 Claims. (Cl. 176—122)

My invention relates to a new and improved source of light, to a new and improved source of light rays, and to a new and improved method of operating a source of light and/or a source of light rays.

The invention includes the production of light rays which are within and without the visible spectrum, such as ultra-violet rays and the like.

One of the objects of my invention is to improve devices which include the use of a gas under low pressure, intermixed with a metallic vapor.

Another object of my invention is to improve devices of this character so as to secure stable operating conditions.

Other objects of my invention will be set forth in the following description and drawing which illustrate a preferred embodiment thereof, it being understood that the above general statement of the objects of my invention is intended merely to generally explain the same and not to limit it in any manner.

Fig. 1 diagrammatically illustrates one of the embodiments of my invention.

It is well known that a gas or gases which are under sufficiently low pressure, and which are contained in a vessel made of insulating material, can be excited to a very high degree of luminescence, by exposing said gases to the action of the lines of force of a rapidly changing electric field and electro-magnetic field. Such vessels or chambers can have their walls made of quartz, or of certain special kinds of glass, according to the light rays which are to be emitted.

Figure 1:
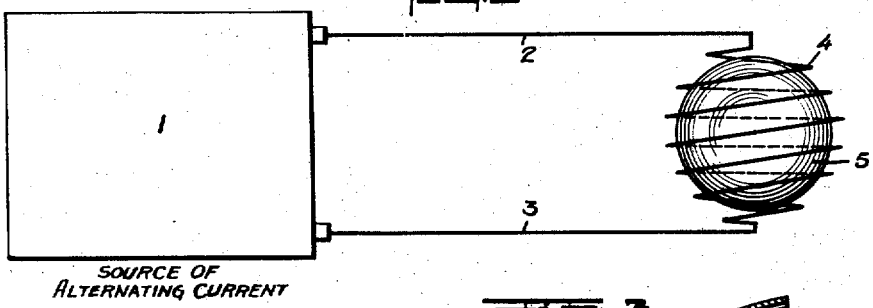

For example, and as shown in Fig. 1, the gas or gases, under suitable low pressure, are located within a sealed vessel 5, said vessel being of spherical shape. I prefer to use the spherical shape, as the maximum luminescence can thus be secured. The vessel 5 is located within a coil 4, so that the vessel 5 forms the core of said coil 4, which has no other core. The coil 4 is connected by means of the leads 2 and 3, to a source 1 of the electric current. The voltage of the source 1 changes very rapidly.

For example, the current which is supplied from the source 1 can be an alternating current of any suitable frequency, said frequency being preferable at least 10,000 cycles per second, while I generally operate on a frequency of three million cycles.

It is desirable for many purposes to have some mercury within the vessel 5, so that mercury vapor is formed when the contents of the vessel 5 are heated, in order to utilize the spectrum of the mercury vapor. This is particularly desirable for medical and other purposes.

When high frequency alternating current is supplied to the coil 4, the potential at the ends of the coil 4 rapidly changes. When this difference of potential at the ends of the coil 4 exceeds a certain value, the gas or gases within the container 5 are ionized, thus rendering said gas or gases conductive.

The electro-magnetic effect of the coil 4 maintains the gas or gases within the vessel 5 at the necessary high temperature, so that said vessel 5 serves as a source of light rays.

If the vessel 5 merely contains gases, and especially one of the noble gases, such as neon, or one of the other gases of this group, it is comparatively simple to produce high luminescence.

Likewise it is simple to increase the luminous effect by simply increasing the strength of the induce electro-magnetic field. Likewise the luminescence can be easily interrupted and restored without delay, by merely interrupting and restoring the rapidly changing electro-magnetic field.

However, if the heated vessel 5 contains a mercury vapor which is heated to a temperature sufficient to cause the mercury vapor to have high luminescence, the pressure of the metallic vapor does not remain constant, but increases rapidly in accordance with the increase of the heat which is produced in the container by the circular arc discharge.

The discharge through the metallic vapor will suddenly stop as soon as the vapor pressure exceeds a critical limit. In such event it is necessary to wait a relative long period of time before the pressure within the container 5 will reduce sufficiently to allow the discharge to take place again. This is particularly objectionable if the vessel 5 is located within a reflector or within a device which surrounds the vessel 5 either partially or completely as such reflector hinders the radiation of heat.

It is attempted to overcome the excessive vapor pressure within the vessel 5 by increasing the strength of the electro-magnetic field, the vapor pressure is correspondingly raised, and so much heat is developed within the vessel 5 as to cause the same to collapse.

It has been proposed to overcome this difficulty by placing within the vessel 5 a quantity of mercury which is very accurately determined, so that there is sufficient mercury vapor within the vessel 5 to meet operating requirements, when all said mercury has been vaporized, while avoiding any excess of mercury, as such excess will produce a vapor pressure above the critical limit.

However, this requires such an accurate determination of the amount of mercury to be placed within each container 5, as to make the manufacturing operation very delicate and expensive.

According to the present invention the container or vessel is cooled so that either all or a part of the external wall of said vessel is cooled so that excess pressure can be eliminated, and the pressure within the container does not exceed the critical limit.

Experience has shown that the cooling effect has a relatively wide range of control so that the cooling effect need not have the same extreme precision and it does not have the same narrow limits as the regulation of the amount of mercury which is placed within the vessel 5.

Figure 2:
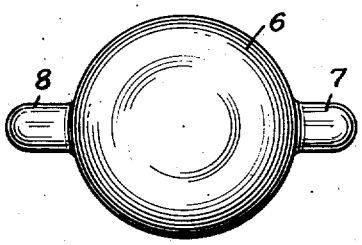
Fig. 2 illustrates another form of bulb or chamber.

As shown in Fig. 2, the improved container 6 which may have a spherical shape or any other desired shape, has a plurality of cooling chambers 7 and 8. There may be one or more of said cooling or condensing chambers, two of said condensing chambers being shown as illustrating one embodiment of the improvement.

When a container of the type shown in the drawing is under the influence of a strong high-frequency current, which passes through the coil 4, the luminescence which is formed is annular and it is parallel to the turns of the coil 4.

In effect the arc forms a secondary winding having a single turn, and which is short-circuited. The central part of the tube remains almost dark. It will be noted that the field of the coil 4 comprises the major portion of the tube or container.

Figure 3:
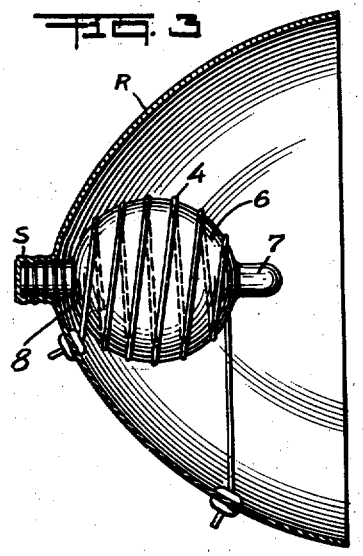
Fig. 3 illustrates a third embodiment of my invention.
Figure 4:
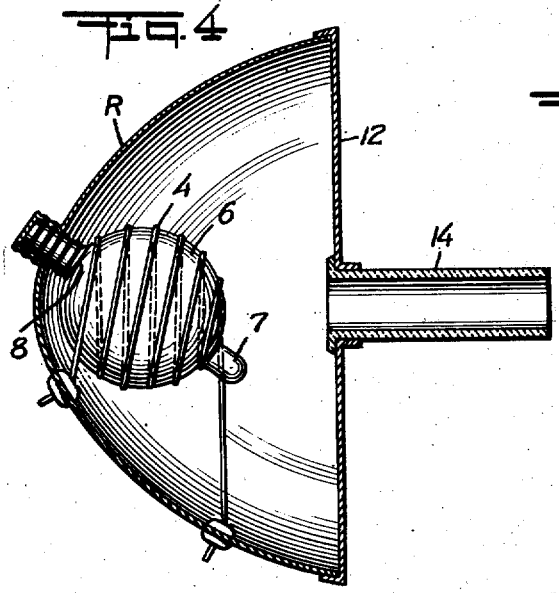
Fig. 4 illustrates a fourth embodiment of my invention, used in connection with an enclosed reflector.

The condensing chamber or chambers are thus located beyond the region of the arc which is thus formed, so that the condensing chamber or chambers are relatively cool. Referring to Figs. 3 and 4, the volume of the condensing chamber or chambers is much less than the volume of the container 6. Likewise, the cooling or condensing chambers 7 and 8 are integral with the container 6. It is therefore possible to simply and economically manufacture the device. The members 6, 7 and 8 in effect form a single chamber, the major portion of which is within the field of the coil 4.

The improved device therefore makes is possible to automatically regulate the vapor pressure within the container 6, even if the amount of metal (mercury or other metal) which is introduced into the container 6 is many times too large to permit operating the vapor-arc without the cooling chamber or chambers.

The operation of the device is not critical so that a simple and easy and practical operation is secured. The best shape and proportions necessarily vary with the shape and volume of each container.

In order to give a practical illustration of my invention, I can state that if the vessel 6 is of spherical form and it has a radius of 4 centimeters, the volume of the condensing chamber (if a single condensing chamber is utilized) should be about 3 cubic cm., and said vessel should have substantially the configuration shown in Fig. 2, assuming that only a single condensing chamber is utilized. The amount of mercury utilized is ½ gram for energy up to 500 watts.

Referring to Fig. 1, an ordinary spherical container 5 can be utilized and the exterior wall of this can be cooled by means of an external air current which can be produced by a fan or the like. The ultra-violet rays which are emitted through the wall of the container 5, ozonize and irradiate the air current, so that said air current can be used for various medical purposes, such as treatment of the hair or the like.

Experience has shown that the mercury actually condenses in the condensing chamber or chambers, even when the arc is normally operating.

The use of a relatively cool condensing chamber or chambers in arc lamps of this type is advantageous, even if the containers only contain gases, without any metal vapors.

Experience has shown that any impurities which may exist within the discharge member 6, and which would ordinarily tend to darken the wall thereof, will be forced to the condenser chamber and remain there.

Referring to Fig. 3, the container 6 represents an induction mercury vapor arc lamp of the type shown, which is partially surrounded by a reflector R, so that the lamp can be readily used for medical and other purposes.

In this case the container may be provided with a single condensing chamber 8 which is located within an externally threaded metal member, which is screwed into a socket S which forms part of the reflector R. This externally threaded metal member 9 conducts the heat from the wall of the condensing chamber. For example, if the lamp is operated so that the beam of light is downwardly directed, the metal member which closely contacts with the outer wall of the condensing chamber tends to cool the same. However, an additional condensing chamber 7 may be provided so as to more efficiently condense the excess mercury vapor; and to take care of the fact that the condensed mercury may fall out of the upper condensing chamber, if the light is downwardly directed.

As shown in Fig. 4, the improved device, having the condensing chambers, may be located within a reflector R having a front wall 12, which is provided with a quartz tube 14. The tube 14 can be also made of glass or metal or of any other suitable reflecting material, in order to direct the rays which are reflected in the form of a concentrated parallel beam by the member R. The member 14 may be a solid rod of quartz or other suitable material.

In this case, the container 6 is completely enclosed and the condensing chambers 7 and 8 must be made sufficiently large in order to condense the excess mercury.

Figure 5:
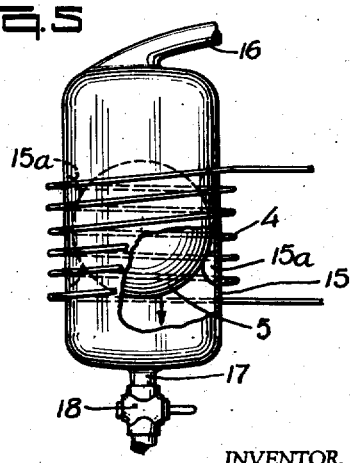
Fig. 5 illustrates another embodiment of my invention.

In the embodiment shown in Fig. 5, the container 5 is located within a vessel 15. Water or milk or other liquid to be sterilized passes through the vessel 15 in the direction of the arrow by means of a suitable inlet pipe 16 and a suitable outlet pipe 17. The outlet pipe 17 may be provided with a regulating valve 18, and any other suitable regulating means may be utilized in order to regulate the flow of the liquid through the vessel 15.

The inner wall of the vessel 15 is provided with projections 15*a*, in order to hold the container 5 in position. In this apparatus the rays produced by the vessel 5 irradiate the milk or water or the like, and the container 5 is sufficiently cooled by the regulated passage of the liquid through the vessel 15.

It is to be understood that the embodiment shown in Fig. 2 for example, is the best embodiment for general purposes, as it provides an automatic regulation without the use of external cooling means.

I have shown the condensing chambers 7 and 8 as being sharply defined with respect to the container 6. However, this is not necessary and my invention is not to be limited thereto. The essential feature is that the annular arc which is produced within the container is of predetermined size, and a part of the wall of said container is sufficiently spaced from said arc, so that said spaced part remains sufficiently cool to prevent the pressure within the container from exceeding the predetermined or critical limit.

The zone of the container in which the annular arc is produced may be defined as being the zone of direct luminescence.

I have shown preferred embodiments of my invention, but it is clear that numerous changes and omissions could be made without departing from its spirit. By using a condensing chamber of small volume, as stated in the example, the full same spectrum is secured as in an arc discharge between electrodes.

I claim:

1. As a new and improved article of manufacture, a container having a gas and a vaporizable material located therein, a coil surrounding the major portion of said container, said coil being adapted, when the same is energized by the passage of an electric current through the same, to vaporize said material and to cause said gas and said vaporized material to emit light, said container having a condensing chamber integral therewith and sharply defined from that portion of the container which is surrounded by said coil, said condensing chamber being beyond the zone of direct luminescence, the volume of said condensing chamber being less than two per cent of the volume of that portion of the container which is surrounded by the coil.

2. As a new and improved article of manufacture, a container, an induction coil passing around a major portion of the wall of said container, a medium located within said container and adapted to become excited into luminescence by the passage of an alternating current through said induction coil, so as to produce an arc of predetermined dimensions within said container, a minor portion of the wall of said container being sufficiently spaced from said arc so that the temperature of said spaced part of the wall remains sufficiently low to prevent the pressure within said container from exceeding a predetermined limit, said minor portion being located within an externally threaded metal member which can be screwed into a socket.

3. An electrodes induction lamp comprising a container having a gas and mercury therein, said container having a substantially spherical portion of relatively large volume, and a coil substantially surrounding said spherical portion, so that said spherical portion is located directly within the field of said coil, said spherical portion having an integral extension which is located beyond the ends of said coil and which has a volume which does not exceed 2% of the volume of said spherical portion, said coil being adapted, when said coil is energized by the passage of an electric current through the same to vaporize the mercury within said spherical portion and to excite said gas and said mercury into luminescence within said spherical portion, said extension being sufficiently beyond the ends of the coil and the field thereof so that the mercury vapor is condensed in said extension when said coil is thus energized.

EGBERT VON LEPEL.